United States Patent
DiGiovanni et al.

(10) Patent No.: US 6,381,045 B1
(45) Date of Patent: Apr. 30, 2002

(54) METHOD AND APPARATUS FOR BIDIRECTIONAL COMMUNICATION OVER A SINGLE OPTICAL FIBER

(75) Inventors: David John DiGiovanni, Montclair; Bernard Raymond Eichenbaum, Basking Ridge; Mujibun Nisa Khan, Holmdel, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/103,925

(22) Filed: Jun. 24, 1998

(51) Int. Cl.[7] .................. H04J 14/02; H04B 10/12; H04B 10/13; H04B 10/135
(52) U.S. Cl. .................. 359/114; 359/116; 359/173; 385/127
(58) Field of Search .................. 359/173, 114, 359/116, 153, 152; 385/123, 127

(56) References Cited

U.S. PATENT DOCUMENTS

| | | | | |
|---|---|---|---|---|
| 4,134,642 A | * | 1/1979 | Karpon et al. | 350/96.33 |
| 4,232,938 A | * | 11/1980 | Dabby et al. | 350/96.2 |
| 4,279,465 A | | 7/1981 | Vojvodich | 350/96.2 |
| 4,314,740 A | | 2/1982 | Bickel | 350/96.15 |
| 4,650,281 A | * | 3/1987 | Jaeger et al. | 350/96.33 |
| 4,806,289 A | * | 2/1989 | Laursen et al. | 264/1.5 |
| 4,986,629 A | * | 1/1991 | Auge et al. | 350/96.32 |
| 5,283,447 A | | 2/1994 | Olbright et al. | 257/85 |
| 5,418,870 A | * | 5/1995 | Kech et al. | 385/31 |
| 5,430,817 A | | 7/1995 | Vengsarkar | 385/37 |
| 5,491,712 A | | 2/1996 | Lin et al. | 372/50 |
| 5,604,587 A | * | 2/1997 | Che et al. | 356/246 |
| 5,659,644 A | * | 8/1997 | DiGiovanni et al. | 385/31 |
| 5,881,196 A | * | 3/1999 | Phillips | 385/127 |
| 5,920,582 A | * | 7/1999 | Byron | 372/6 |
| 5,963,349 A | * | 10/1999 | Norte | 359/116 |

OTHER PUBLICATIONS

K.D. Choquette et al., "Detector–enclosed Vertical Cavity Surface Emitting Lasers," *Electronic Letters* (29) 5, p. 466, (1993).

* cited by examiner

*Primary Examiner*—Leslie Pascal

(57) ABSTRACT

Dual concentric core fiber is used for optical communication. Inbound messages lying in a first wavelength channel are received from a terminal portion of the fiber, and outbound messages lying in a second such channel are injected into the terminal portion. The optical fiber has at least one annular portion surrounding a central core portion. The inbound messages are received from the annular portion, and the outbound messages are injected into the central core portion. Alternatively, the inbound messages are received from the central core portion, and the outbound messages are injected into the annular portion.

14 Claims, 4 Drawing Sheets

Construction of a Dual-Concentric-Core Fiber (DCCF)

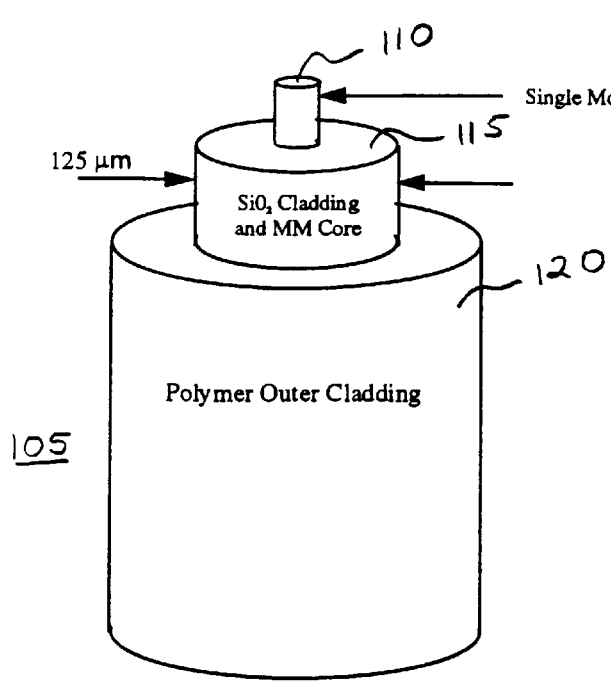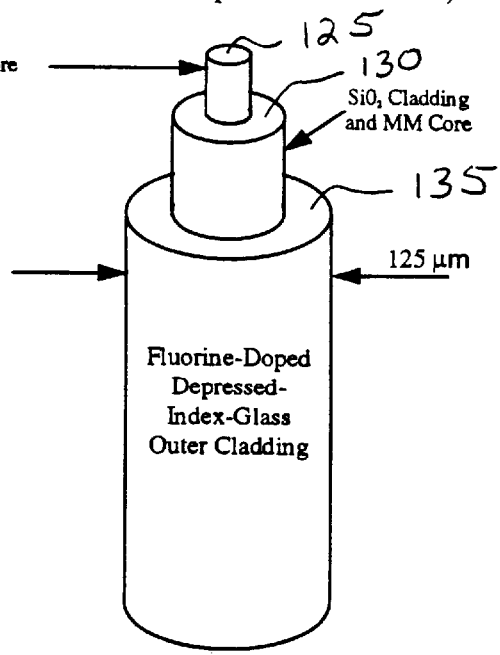
FIG. 4A
FIG. 4B

METHOD AND APPARATUS FOR BIDIRECTIONAL COMMUNICATION OVER A SINGLE OPTICAL FIBER

FIELD OF THE INVENTION

This invention relates to optical communication systems in which electro-optical emitters and detectors are coupled to the ends of optical fibers for sending and receiving signals along the fibers. More specifically, this invention relates to those communication systems in which individual fibers carry signals bidirectionally.

BACKGROUND OF THE INVENTION

Because optical fibers can transmit information at much greater rates than copper wire, there is much interest in schemes for delivering telecommunication services to customer premises, such as residential homes, over optical fiber. These schemes fall into two general classes, depending on whether each terminal location receives transmissions from the central office over its own dedicated line, or whether multiplexing is used to reduce the number of fibers that fan out from the central office. The first scheme is said to have Point-to-Point (PTP) Architecture. When passive optical components are used at intermediate locations to demultiplex downstream signals (and, in some cases, to multiplex upstream signals), the second scheme is said to have Passive Optical Network (PON) architecture.

One problem encountered by designers of PTP networks is fiber congestion at the central office or active remote node (ARN), where downstream signals are placed on optical fibers. There is a need for line cards with high-density electro-optical interfaces, to alleviate this congestion.

One problem encountered by designers of both PON and PTP networks is the need for expensive equipment at the fiber terminations. That is, bidirectional coupling of signals into and out of the end of an optical fiber typically calls for optical splitters and couplers that are bulky and expensive to manufacture. In PON networks in particular, this is a problem for fiber installations within the customer premises. Typically, a fiber extends from the on-premises optical network unit (ONU) to a network PON fiber termination defining the physical interface between the network and the customer premises. There is a strong economic incentive to reduce the cost of the interfaces at the ends of this fiber.

SUMMARY OF THE INVENTION

We have discovered that these, and other, problems of bidirectional communication in optical networks can be alleviated by using dual concentric core fiber (DCCF) to carry optical signals bidirectionally. In one broad aspect, our invention involves a method for communicating messages, in the form of modulated optical signals, over an optical fiber. Inbound messages lying in a first wavelength channel are received from a terminal portion of the fiber, and outbound messages lying in a second such channel are injected into the terminal portion. The optical fiber has at least one annular portion surrounding a central core portion. The inbound messages are received from the annular portion, and the outbound messages are injected into the central core portion. In alternate embodiments of the invention, the inbound messages are received from the central core portion, and the outbound messages are injected into the annular portion.

As used herein, the directions indicated by the terms "inbound" and "outbound" are relative to the terminal device under discussion, irrespective of whether the signals so described are directed toward or away from the central office. Those directions are indicated, respectively, by the terms "upstream" and "downstream".

BRIEF DESCRIPTION OF THE DRAWINGS

FIG. 4A is a schematic drawing of an exemplary DCCF having a polymeric outer cladding.

FIG. 4B is a schematic drawing of an exemplary DCCF having an outer cladding of depressed-index glass.

DETAILED DESCRIPTION

Figure 1:
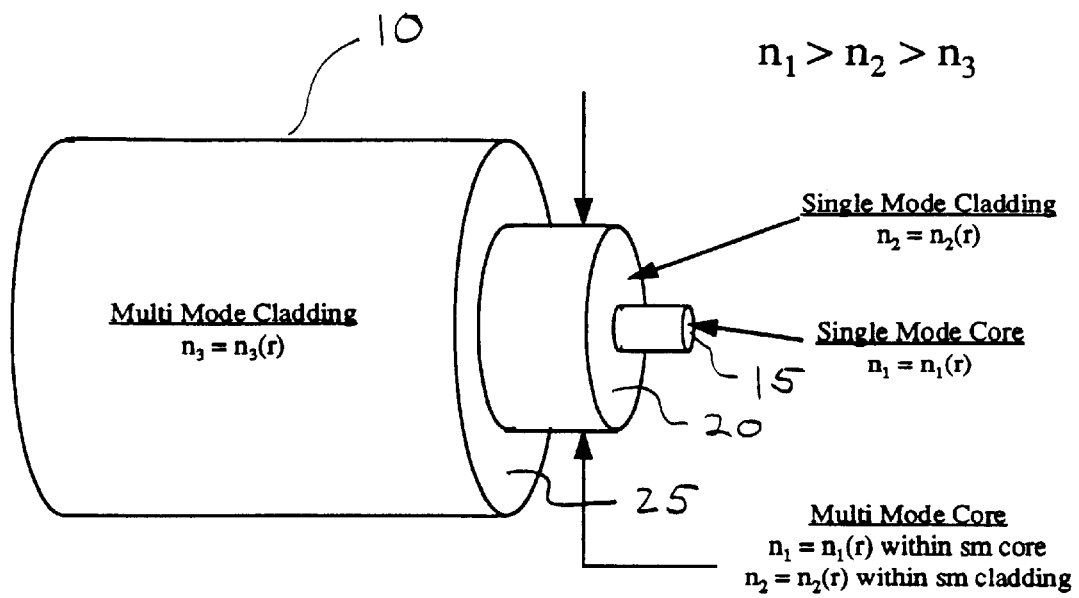
FIG. 1 is a schematic diagram of an illustrative dual concentric core fiber (DCCF).

FIG. 1 shows a typical DCCF useful for the practice of the invention. As shown in the figure, DCCF 10 includes central, single-mode core 15, annular, single-mode cladding 20, and annular, multimode cladding 25. Although the refractive index may be constant within each of these three portions, the DCCF is more generally described in terms of respective, radially dependent refractive index profiles $n_1(r)$, $n_2(r), n_3(r)$ for core 15, cladding 20, and cladding 25, respectively. The effective refractive index is greatest for core 15, and least for cladding 25. The diameter of core 15 and the effective refractive index of cladding 20 relative to that of core 15 are advantageously chosen in such a way that only the fundamental mode $TEM_{00}$ is guided within core 15. On the other hand, core 15 and cladding 20, in combination, behave as a core for guiding multiple modes. The number of modes guided within this combination, serving as a multimode core, is determined by the outer diameter of cladding 20 and the effective refractive index of this combination, relative to that of cladding 25.

It should be noted in this regard that unlike single-mode propagation, multimode propagation is subject to modal dispersion. As a consequence, a multimode fiber generally has less transmission bandwidth than a comparable single-mode fiber. However, we believe that DCCFs are readily provided having a transmission bandwidth of 50 MHz-km or more. A transmission bandwidth of 50 MHz-km is enough to be useful for downstream transmissions over the distances encountered within residences and other customer premises, since these typically call for data rates of 155 Mb/s or less, over distances of 300 m or less. The same transmission bandwidth is also enough to be useful for upstream transmissions, not only within a residence, but also over the distances encountered within a distribution area of the access plant, which typically calls for data rates of 50 Mb/s or less over distances of a few kilometers or less.

One advantage of a DCCF is that it can be directly coupled to an electro-optical source and detector without the need for passive splitting and coupling elements. Advantageously, the source and detector are integrated in a single, compact device with a spacing close enough for both to be butted against the DCCF such that one is coupled to the single-mode core, and the other is coupled to the multimode core.

Even more advantageously, the source and detector are integrated in a concentric configuration in which the source occupies an annular region about the detector, or the detector occupies an annular region about the source. In such a device, it is desirable for the cross section of the central device to match that of the single-mode core, and for the cross section of the annular device to match that of the outer portion of the multimode core (i.e., of the single-mode cladding).

Figure 2:
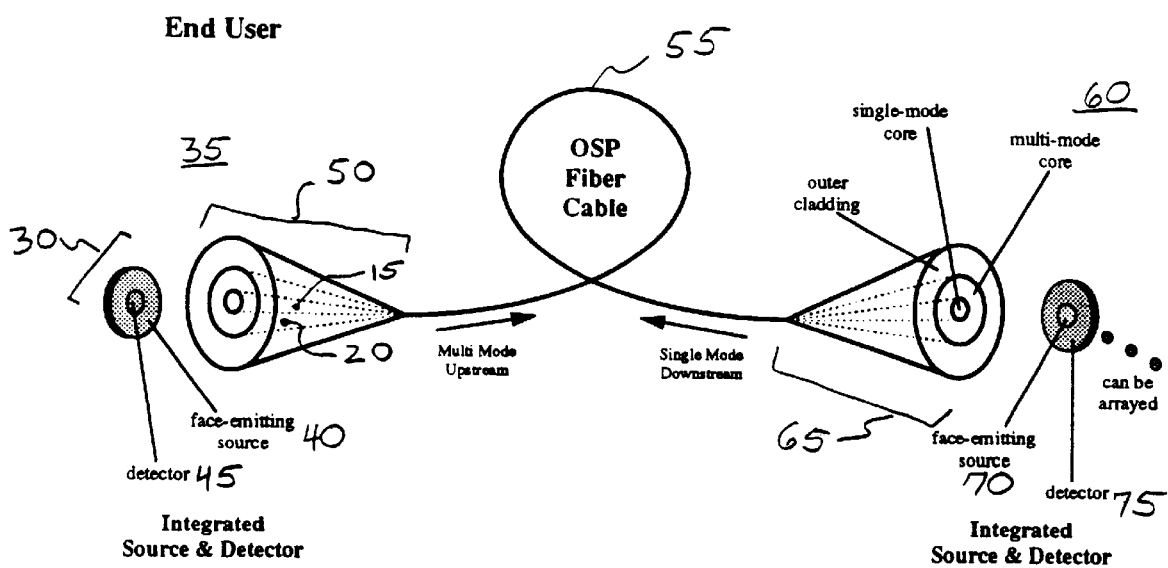
FIG. 2 is a schematic illustration of a DCCF in use for bidirectional communication in accordance with the invention.

Such an arrangement is shown in FIG. 2. As shown in the figure, electro-optical device 30 at user terminal 35 includes annular, face-emitting source 40 and central detector 45. As shown in expanded view 50 of the near end of DCCF 55, detector 45 butts against and aligns with core 15, and source 40 butts against and aligns with cladding 20. (In all of the figures, like reference numerals denote like elements.) At upstream terminal 60, as shown in expanded view 65 of the near fiber end, central source 70 butts against and aligns with core 15, and annular detector 75 butts against and aligns with cladding 20.

For even greater compactness, it is advantageous to fabricate the concentric source-detector pairs in arrays, and to couple such arrays, in unitary fashion, to multifiber cables such as ribbon cables.

We believe that concentric source-detector pairs useful for operation as described above are readily made using conventional fabrication techniques for light-emitting diodes (LEDs) and surface detectors. An example of fabrication technology of this kind is provided by U.S. Pat. No. 5,283,447, issued on Feb. 1, 1994 to G. R. Olbright et al. under the title "Integration of Transistors with Vertical Cavity Surface Emitting Lasers". Described there are monolithically integrated optoelectronic circuits including a vertical-cavity surface-emitting laser and a transistor, such as a phototransistor.

It should be noted in this regard that capacitance in monolithically integrated devices of this kind may in some cases be high enough to preclude applications for high-speed data transmission. Alternate devices are readily provided for use in such applications. For example, U.S. Pat. No. 4,314,740, issued on Feb. 9, 1982 to G. W. Bickel under the title "Optical Fiber Beam Splitter Coupler" describes a passive beam splitting device that is readily interposed between the FTTH and one member of the source/detector pair, while juxtaposed to the other member of the source-detector pair. In particular, an array of such devices will be useful for providing, in a very compact fashion, passive coupling between an array of sources and detectors, and an FTTH fiber array.

Another passive coupling device, useful in this regard, is described in U.S. patent application Ser. No. 08/897,195, filed on Jul. 21, 1997 by D. J. DiGiovanni et al., and commonly assigned herewith. As described there, a coupler is made from a bundle of multimode fibers packed around a central fiber having a single-mode core. Coupling is effectuated by heating and tapering the bundle, and fusion splicing it to a single-mode main fiber (which, in the example given in the cited patent application, is a cladding-pumped laser). Light in one wavelength region can be coupled between the respective single-mode cores of the bundle and the main fiber. Optoelectronic sources or emitters (according to the example described in the cited patent application, they are semiconductor broad stripe emitters) are coupled to the distal ends of the individual multimode fibers, and through those fibers, to the cladding of the main fiber.

An exemplary application of the DCCF for a PTP network is conveniently discussed with further reference to FIG. 2. In this application, terminal 60 is the central office or an active remote node (ARN). From there, the downstream transmission signal is launched into core 15 and propagated as a single-mode transmission to an ONU at the customer premises, which includes source 40 and detector 45. At the ONU, source 40 launches the upstream signal into the multimode core (i.e., core 15 and cladding 20 in combination) for multimode transmission to terminal 60.

Figure 3:
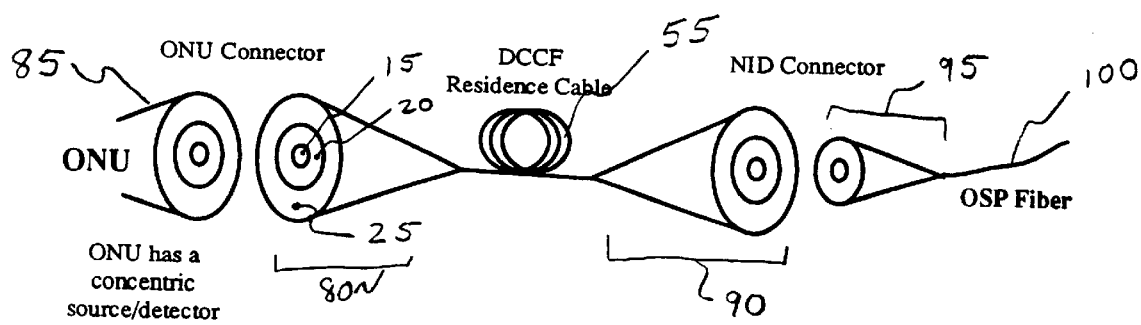
FIG. 3 is a schematic illustration of a DCCF in use within a residence or other customer premises for coupling an ONU to an outside plant (OSP) fiber.

FIG. 3 shows an exemplary application of DCCF 55 within customer premises. Downstream end 80 of the DCCF (shown in expanded view) is coupled to ONU 85, which includes a concentric source-detector pair or the like. Upstream end 90 (also shown in expanded view) is coupled to network fiber termination 95. Fiber termination 95 is the connector to network outside plant (OSP) fiber 100. Fiber termination 95 is typically situated in a Network Interface Device (NID) at the side of the residence or other customer premises. OSP fiber 100 is a single-mode fiber such as standard 5D fiber. By way of example, fiber 100 supports 1.55 $\mu$m downstream transmission and 1.31 $\mu$m upstream transmission.

In operation, DCCF 55 carries 1.31 $\mu$m upstream transmissions from the ONU via core 15 to OSP fiber termination 95. From there, the upstream transmissions couple into the core of fiber 100 and propagate toward the central office.

Downstream transmissions, at the longer wavelength of 1.55 $\mu$m, are initially coupled from fiber termination 95 into the core of DCCF 55. However, in this application, a feature of the DCCF to be described below causes the energy at this longer wavelength to escape from the single-mode core and couple into cladding modes (with respect to core 15 and cladding 20). That is, the energy is guided in the multimode core described earlier. Thus, the injection of the downstream transmission at fiber end 90 has the effect of injecting the transmission into both core 15 and cladding 20. As a consequence, when downstream signals in DCCF 55 reach ONU 85, they can be detected there by, e.g., an annular detector.

Although the 1.55 $\mu$m downstream signals are to be coupled into cladding modes, a DCCF effective for this purpose is readily made that will remain an effective single-mode waveguide for the 1.31 $\mu$m upstream signals. Such a DCCF behaves as a directional coarse wavelength-division multiplexer (CWDM) when used in conjunction with a concentric source-detector pair.

One special feature that will effectuate the desired out-coupling of energy into cladding modes is a long-period grating written into single-mode core 15. Techniques for writing these gratings using, e.g., actinic radiation are well known, and need not be described here in detail. One useful description of some such techniques may be found in U.S. Pat. No. 5,430,817, issued on Jul. 4, 1995 to A. M. Vengsarkar under the title "Optical Systems and Devices Using Long Period Spectral Shaping Devices." A long-period grating is a refractive index Bragg grating. The repeat distance A of such a grating is selected such that forward-propagating fundamental mode light is coupled into forward propagating higher-order-mode light. Periods typically are several hundred micrometers, and typical grating lengths are 1–5 cm. Index change induced by actinic radiation is on the order of $10^{-4}$.

An alternative feature for effectuating the same purpose is provided by tailoring the refractive index profile of the DCCF. That is, the $\Delta$n, or relative refractive index difference, between core 15 and cladding 20 is selected such that 1.3 $\mu$m signals are confined by the single-mode core, but 1.55 μm signals are not. This could be achieved, for example, in a DCCF having core 15 and cladding 20 similar to the core and cladding of standard non-dispersion-shifted fiber, dispersion shifted fiber, or non-zero dispersion fiber, but in which one or both of the core diameter and Δn are adjusted to make the fiber only weakly guiding at 1.55 μm. For example, reducing the core index of Lucent 5D fiber from Δn=0.0045 to Δn=0.0035 and keeping the same core diameter of 8.2 μm leads to a fiber in which attenuation of the energy at 1.55 μm is estimated to be greater than 30 dB over 100 m due to bends induced during normal cabling or installation.

One exemplary design for a DCCF is shown in FIG. 4A. As shown in the figure, DCCF 105 includes core 110 and cladding 115 of a standard Lucent 5D single-mode glass fiber. Polymer coating 120, which is chosen to have a refractive index lower than that of cladding 115, serves as the multimode cladding. This design is advantageous because the manufacturing process is the same as for a standard product, except for the addition of a simple polymer overcoating step to provide coating 120. Thus, production costs are relatively small. Moreover, interconnection with other fibers, such as an OSP fiber, is facilitated because the single-mode core and cladding are a very close match to those of at least some standard fibers.

A second exemplary design for a DCCF is shown in FIG. 4B. To make the preform from which this fiber is drawn, a standard core rod, such as a Lucent 5D core rod, is first fabricated using MCVD (Modified Chemical Vapor Deposition). The inner and outer portions of the standard core rod are the precursors for single-mode core 125 and pure silica single-mode cladding 130, respectively. According to conventional techniques, the standard core rod would then be enclosed in an overclad tube of pure silica. In our design, however, the overclad tube is not made of pure silica. Instead, it is made from silica doped with fluorine to depress its refractive index. When the fiber is drawn from the resulting preform, the overclad tube provides multimode cladding 135. If the core rod and overclad tube have the same dimensions as those for making 5D fiber, the resulting DCCF is readily made to match 5D fiber in core diameter and outer cladding diameter.

Alternatively, core and cladding portions of a preform are grown from silica soot by VAD (Vapor Axial Deposition). In a subsequent growth step, fluorine-doped silica is deposited to form the region that will ultimately give rise to the multimode cladding.

The invention claimed is:

1. A method for optical communication, comprising:
   receiving inbound messages from a terminal portion of an optical fiber, wherein said messages are received in the form of a modulated inbound optical signal lying in a first wavelength channel; and
   injecting outbound messages into the terminal portion of the optical fiber, wherein said messages are injected in the form of a modulated outbound optical signal lying in a second wavelength channel,
   CHARACTERIZED IN THAT:
      the receiving step comprises substantially receiving the inbound signal from an annular portion of the optical fiber, said annular portion surrounding a central core portion of said fiber; and
      the injecting step comprises substantially injecting the outbound signal into the central core portion of the fiber.

2. A method for optical communication, comprising:
   receiving inbound messages from a terminal portion of an optical fiber, wherein said messages are received in the form of a modulated inbound optical signal lying in a first wavelength channel; and
   injecting outbound messages into the terminal portion of the optical fiber, wherein said messages are injected in the form of a modulated outbound optical signal lying in a second wavelength channel,
   CHARACTERIZED IN THAT:
      the receiving step comprises substantially receiving the inbound signal from a central core portion of the fiber, and
      the injecting step comprises substantially injecting the outbound signal into an annular portion of the optical fiber, said annular portion surrounding said central core portion.

3. The method of claim 1 or claim 2, wherein the first and second wavelength channels occupy separate and distinct portions of the electromagnetic spectrum.

4. A method for optical communication, comprising:
   receiving inbound messages from a terminal portion of an optical fiber, wherein said messages are received in the form of a modulated inbound optical signal lying in a first wavelength channel; and
   injecting outbound messages into the terminal portion of the optical fiber, wherein said messages are injected in the form of a modulated outbound optical signal lying in a second wavelength channel spectrally separate and distinct from the first wavelength channel,
   CHARACTERIZED IN THAT:
      the receiving step comprises substantially receiving the inbound signal from a central core portion of the fiber, and
      the injecting step comprises injecting at least a portion of the outbound signal into said central core portion, and substantially out-coupling said portion from a mode guided by the core portion into a mode guided by the core portion in combination with an adjacent, surrounding, annular portion of the optical fiber.

5. The method of claim 1, claim 2, or claim 4, wherein the injecting step is carried out by operating an electro-optical emissive device juxtaposed to an end of the fiber.

6. The method of claim 1, claim 2, or claim 4, wherein the receiving step is carried out by operating an electro-optical receiver juxtaposed to an end of the fiber.

7. The method of claim 1, claim 2, or claim 4, wherein the injecting and receiving steps are carried out by operating, respectively, an electro-optical emissive device and an electro-optical receiver, both juxtaposed to an end of the fiber.

8. A method for operating an optical communication network that comprises at least one optical fiber having a central core portion and an annular portion surrounding said central core portion, the method comprising transmitting signals in mutually opposing first and second directions through said fiber, CHARACTERIZED IN THAT:
   signals transmitted in the first direction are guided by the central core portion; and
   signals transmitted in the second direction are guided by the central core portion in combination with an adjacent region of the annular portion.

9. Apparatus comprising an optical fiber having first and second ends, a first source and a first detector optically coupled to the first end, and a second source and a second detector optically coupled to the second end,
   CHARACTERIZED IN THAT:
      the optical fiber has a single-mode core;
      the single-mode core is surrounded by a radially non-uniform cladding;

the single-mode core is adapted for guiding radiation in at least a first wavelength channel;

an annular portion of the cladding adjacent the single-mode core is adapted such that said annular portion and said single-mode core, in combination, comprise a multi-mode core for guiding radiation in at least a second wavelength channel;

the first source is optically coupled to the single-mode core at least with respect to radiation in the first channel; and the second source is optically coupled to the multi-mode core at least with respect to radiation in the second channel.

10. Apparatus of claim 9, wherein the first source and first detector are included in a concentric, integrated source-detector pair optically coupled to an end of the optical fiber.

11. Apparatus of claim 10, wherein the first source occupies a central portion of the source-detector pair, and the first detector occupies an annular portion of the source-detector pair.

12. Apparatus of claim 9, wherein the second source and second detector are included in a concentric, integrated source-detector pair optically coupled to an end of the optical fiber.

13. Apparatus of claim 12, wherein the second source occupies an annular portion of the source-detector pair, and the second detector occupies a central portion of the source-detector pair.

14. Apparatus of claim 9, wherein:

the second source is optically coupled to the optical fiber such that radiative emissions from said source are initially at least partially coupled into the single-mode core; and the optical fiber further comprises a grating effective for out-coupling radiation of the second channel from the single-mode core to a mode or modes guided by the multi-mode core.

* * * * *